United States Patent [19]

Wackerle et al.

[11] Patent Number: 4,562,975
[45] Date of Patent: Jan. 7, 1986

[54] APPARATUS FOR WINDING TUBULAR STRUCTURAL COMPONENTS

[75] Inventors: Peter M. Wackerle, Ottobrunn; Franz Sperber, Kolbermoor; Walter Weber, Assling, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 680,276

[22] Filed: Dec. 10, 1984

[30] Foreign Application Priority Data

Dec. 13, 1983 [DE] Fed. Rep. of Germany ....... 3345011

[51] Int. Cl.$^4$ ...................... B65H 81/06; B65H 65/00
[52] U.S. Cl. .................................. 242/7.21; 156/172; 156/425; 156/429; 242/158.2
[58] Field of Search ...................... 242/2, 3, 7.14–7.19, 242/158.2; 152/170, 172, 173, 425, 429, 445

[56] References Cited

U.S. PATENT DOCUMENTS 2,607,540 8/1952 Rekettye ................................. 242/3
4,080,915 3/1978 Bompard et al. ................... 242/7.21
4,529,139 7/1985 Smith et al. ........................ 242/7.21

Primary Examiner—Billy S. Taylor
Attorney, Agent, or Firm—W. G. Fasse; D. H. Kane, Jr.

[57] ABSTRACT

Crash or shock absorbing structural components made of fiber reinforced synthetic materials and having portions of different diameters including at least one portion of a larger diameter than another portion, are produced by winding synthetic fibers onto a winding arbor (6) in a desired winding pattern. For this purpose a winding support cage (14) is arranged on the winding arbor (6). The winding support cage (14) has circumferential end edges provided with cut-outs (18, 18') for receiving fiber strands. Arresting pins (25, 26) reach into pairs of these cut-outs for temporarily holding the winding support cage (14) against rotation with the winding arbor when a fiber guide (12) moves into a respective starting position for the next winding operation. The cut-outs are so spaced circumferentially and the coordination of the cut-outs to the position of the fiber guide (12) is such that during a winding operation a fiber strand is always deposited in the correct cut-out (18, 18') for producing the desired winding pattern.

8 Claims, 3 Drawing Figures

APPARATUS FOR WINDING TUBULAR STRUCTURAL COMPONENTS

FIELD OF THE INVENTION

The invention relates to an apparatus for winding tubular structural components, especially hollow cylindrical components such as vehicle steering columns or the like.

DESCRIPTION OF THE PRIOR ART

Winding machines for winding cylindrical structural components of fiber reinforced synthetic material are known. Such machines comprise a winding arbor and a thread or fiber guiding device which is movable back and forth in parallel to the winding arbor for properly guiding the fiber strand to be wound onto the arbor. It is also known to wind the fiber strands on an axial portion of the winding arbor so that the strands extend along a non-geodesic path. Thus, different diameter portions are formed for the tubular structural component. On the smooth surface of a cylindrical winding arbor the fiber strand which is kept under tension during the winding operation, is guided in such a manner that it travels on a path which is the shortest connection between two points on the arbor. Such a path is referred to as a geodesic path.

However, it is occasionally necessary to wind the fiber strand onto the winding arbor along a non-geodesic path, for example, when the structural component which has different diameters along its axial extension, is to be provided with a predetermined winding pattern. A non-geodesic path is longer than the shortest connection of two points. A winding pattern in this context is defined as the division of the winding arbor circumference into equal circumferential portions or spacings, whereby the division is accomplished by the sequential winding strokes. The size of a winding pattern may easily be determined by simply counting the squares formed by the cross-over windings on a winding arbor around the circumference of the winding arbor. A winding stroke in this context is the operation of the winding apparatus during a back and forth movement of the thread or fiber strand guiding device.

OBJECTS OF THE INVENTION

In view of the above it is the aim of the invention to achieve the following objects singly or in combination:

to construct a winding apparatus which is capable to deposit or wind fiber strands on a winding arbor along a non-geodesic path, at least along a portion of the axial length of the arbor so that, for example, a predetermined winding pattern may be accomplished even if the diameter of the tubular structural component varies along the axial length of the tubular component;

to provide an apparatus which includes a winding cage on the winding arbor, whereby cut-outs on the winding cage are coordinated or synchronized in a precisely defined angular position relative to a starting winding position of the fiber strand guiding device; and to make sure that fiber strands which cross each other at an axial end edge of a winding cage cross each other in a cut-out of the winding cage.

SUMMARY OF THE INVENTION

According to the invention there is provided an apparatus for winding substantially cylindrical structural components made of fiber reinforced synthetic material, onto a winding arbor. The apparatus includes a thread or fiber strand guiding device which is movable back and forth in parallel to the rotational axis of said winding arbor. The apparatus further includes means for laying the fiber strands along at least one axial portion of said winding arbor in a non-geodesic path. These means for laying comprise a winding cage on the winding arbor and at least one stop member which may be kept stationary relative to the rotating winding arbor. The stop member may engage the winding cage thereby preventing its rotation with the winding arbor, or disengage from the winding cage thereby permitting rotation of the winding cage with the winding arbor. For this purpose the winding cage is mounted on the winding arbor by a friction clutch device which permits rotation of the winding arbor alone when the stop member engages the winding cage and which permits rotation of the winding cage with the winding arbor when the stop member disengages the winding cage. The winding cage has at least one circumferential edge or two circumferential edges. The circumferential edge or edges are provided with cut-outs which are angularly spaced from each other by a predetermined spacing in the circumferential direction of the winding cage in such a way that, upon release of the winding cage by the stop member, the fiber strand is deposited in said cut-outs during a winding operation. Stated differently, the release of the winding cage, the back-and-forth motion of the strand guiding device and the winding position of the winding cage are so coordinated or synchronized to each other, due to said predetermined spacing that the deposition of the fiber strand or strands being wound in predetermined cut-outs is assured, and the winding pattern along the non-geodesic paths on the winding cage is obtained.

The fiber reinforced synthetic material is not yet cured when the preimpregnated fiber strands are being wound onto the winding arbor and winding cage. The synthetic material is a resin which is cured after the winding operation is completed.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
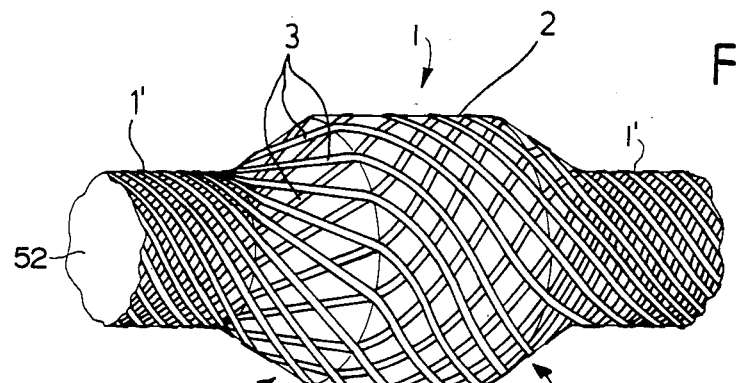
FIG. 1 shows a perspective view of a portion of a tubular structural component wound on an apparatus according to the invention and requiring a non-geodesic path for the fiber strands.

FIG. 1 shows a portion of a tubular structural component 1, made of fiber reinforced synthetic material. The tubular component 1 comprises two sections or portions 1' having a given smaller diameter than a second portion 2 intermediate the sections 1'. Conical portions 4 and 5 lead from the respective narrower diameter section 1' into the larger diameter section 2. The fiber compound material comprises fiber strands 3 laid down by the winding operation to be described below in a cross-over relationship to form a predetermined winding pattern, whereby the winding angle may, for example, be about ±45° relative to the longitudinal axis of the component 1.

The structural component 1 may, for example, be part of a steering column in a vehicle, whereby the larger diameter section 2 has a predetermined breaking strength so that it will break in response to a given bending and/or axial load applied to the structural component 1.

As shown in FIG. 1 the angle or degree of advance of the winding pattern of the section 2 is zero so that during each winding stroke the next fiber strand 3 is deposited precisely on top of the previously deposited fiber strand. As a result, in the section 2 the winding pattern resembles that of a chain link fence which does not provide any complete coverage, rather, a basket weave or, as mentioned, a chain link fence type pattern of the fiber strands 3 results.

It has been found that the tubular component 1 or rather its enlarged diameter section 2 is capable of transmitting the required torsion forces, for example, in a steering column, if the crossing points of the fiber strands are located where the end edge of the large diameter section 2 merges into the respective conical section 4 and 5. In other words, the tips of the angles enclosed by crossing fiber strands 3 all point toward the interface between the end edge of the large diameter section 2 and the respective conical section 4 or 5. Thus, the path of the fiber strand 3 between the tubular section 1' having the smaller normal diameter and the large diameter section 2 deviates substantially from a geodesic line or path, especially in the conical sections 4 and 5.

Figure 2:
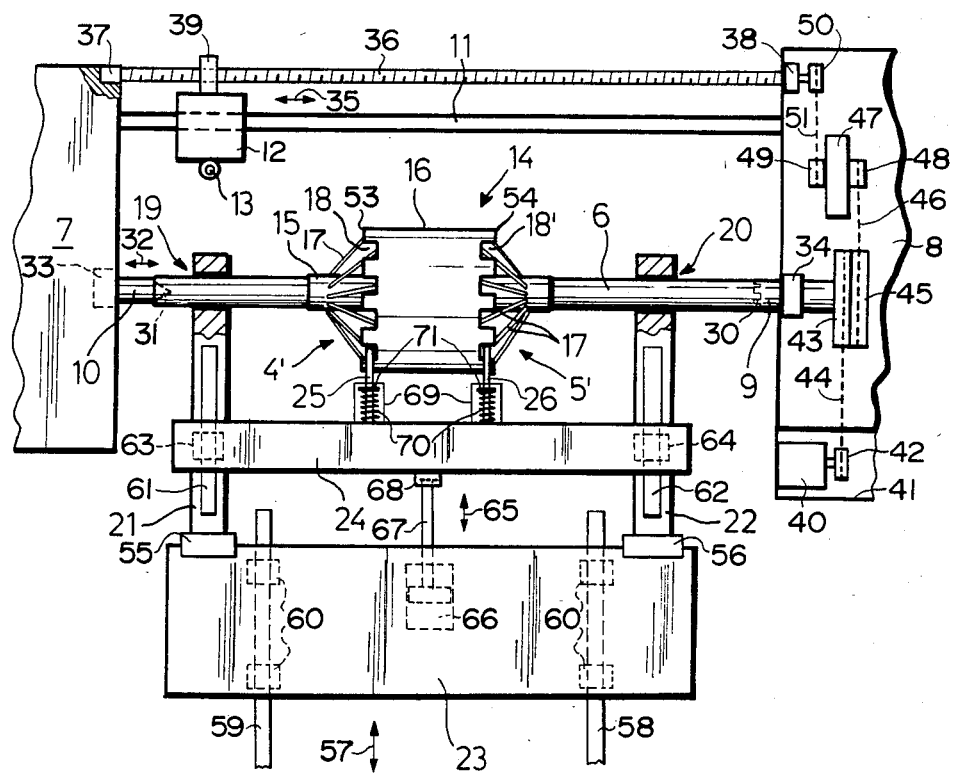
FIG. 2 is a somewhat simplified top plan view of one embodiment of the winding apparatus according to the invention.

FIG. 2 shows the present apparatus comprising machine frame components 7 and 8 secured to or resting on a factory floor. A winding arbor 6 is supported in the machine frame 7, 8 by a mounting and centering spindle 10 and a drive spindle 9. The drive spindle 9 is releasably connected to the winding arbor 6 by a clutching mechanism 30, for example, a conventional clutching mechanism with Hirth type teeth. At its opposite end the winding arbor 6 is centered by a centering cone 31 of the mounting spindle 10 which is axially displaceable in a conventional manner as indicated by the double arrow 32. Additionally, the mounting spindle 10 is conventionally mounted as shown at 33 in the machine frame 7. The left-hand end of the winding arbor 6 has a centering hole for engagement by the centering pin 31 of the mounting spindle 10. The drive spindle 9 is conventionally supported by bearing means 34 in the machine frame 8. The drive of the drive spindle 9 will be described in more detail below.

A guide rail 11 is rigidly mounted to the machine frame members 7 and 8 for carrying and guiding a thread or fiber strand guiding device 12 provided with a strand guide eye 13. The strand guiding device 12 is movable back and forth along the guide rail 11 as indicated by the double arrow 35. For this purpose a threaded spindle 36 is rotatably mounted in bearings 37, 38 supported in the respective machine frame members 7 and 8. A spindle nut 39 engages the threaded spindle 36 so that rotation of the spindle 36 in one or the other direction moves the thread guiding device 12 back and forth along the guide rail 11. The drive means for the threaded spindle 36 will also be described in more detail below. A fiber strand impregnated with synthetic resin is led through the strand guide eye 13 for supplying the strand onto the winding arbor 6.

The speed at which the strand guiding device 12 travels along the guide rail 11 is synchronized with the rotational speed of the winding arbor 6. For this purpose the rotation of the drive spindle 9 and the rotation of the threaded spindle 36 are coordinated to each other through a common drive mechanism shown schematically in the right-hand side of FIG. 2. A motor 40 is supported on a mounting bracket 41 secured to the machine frame member 8. A drive sprocket 42 is connected to a further drive sprocket 43 by a drive chain 44, for example, for driving the drive spindle 9. A further drive sprocket 45 mounted on the spindle 9 drives a further chain 46 which in turn provides an input drive to a synchronizing gear mechanism through a sprocket 48. The output of the gear mechanism 47 is connected through two sprockets 49 and 50 and a further drive chain 51 to the threaded spindle 36. Conventional means, not shown, are provided for controlling the gear mechanism 47 in such a way that it reverses the rotational direction of the threaded spindle 36 when the strand guiding device 12 reaches an end position. Conventional trip dogs providing respective electrical control signals may be used for this purpose, for example. However, electronic direction reversing control means may also be employed for this purpose. The just described synchronized drive mechanism makes sure that the back and forth movement of the strand guide device 12 and the angular position of a winding cage 14 on the winding arbor 6 are so synchronized or coordinated to each other that by taking into account certain cut-outs 18, 18', the deposition of the fiber strand or strands being wound takes place in predetermined ones of said cut-outs 18, 18'. This will be described in more detail below.

For providing the above mentioned non-geodesic path for the winding strands 3 the winding cage 14 is mounted on the winding arbor 6 with the aid of an inner sleeve 15 connected to a concentric outer sleeve 16 by spokes 17. The inner sleeve 15 and the outer sleeve 16 as well as the spokes 17 are constructed as thin as possible to be just capable of initially supporting the wound body prior to its curing. The winding cage 14 remains inside the finished body as shown in FIG. 1. The spokes 17 are so located that they form a slant relative to the longitudinal axis of the arbor 6 and such slant corresponds to the conical slant of the wall sections 4, 5 of the body 1. Thus, the spokes 17 form conical facing end surfaces 4', 5' as shown in FIG. 2.

The end edge 53 of the outer sleeve 16 of the winding cage 14 is provided with cut-outs 18. The opposite end edge 54 is provided with cut-outs 18'. These cut-outs 18, 18' are uniformly spaced around the circumference of the outer sleeve 16. The width of the cut-outs 18, 18' in the circumferential direction corresponds to the width of the fiber strand 3 in the circumferential direction of the large diameter section 2 of the body 1 shown in FIG. 1. The radially outer ends of the spokes 17 are connected to the inner surface of the outer sleeve 16 near the bottom of the cut-outs 18, 18'. Thus, the remaining sleeve portions between the cut-outs 18, 18' project axially beyond the radially outer connecting point of the spokes 17.

The winding arbor 6 is rotatably supported in two carrier members 19 and 20 forming the end portions of two support arms 21 and 22 journalled respectively to a carriage 23 by the journals 55 and 56 which permit a lifting and lowering of the arms 21, 22 in unison about a journal axis extending in parallel to the rotational axis of the winding arbor 6 for permitting the removal of the arms 21, 22 from the winding arbor 6 by lowering the arms 21, 22 away from the arbor 6. The arms 21 and 22 are so spaced from each other that the winding cage 14 is substantially centered between the carrier members 19, 20 at the free ends of the arms 21, 22. The bearing surfaces of the carrier members 19, 20 which contact the surface of the winding arbor 6 are provided with a friction reducing coating, for example, any material conventionally used for sleeve bearings.

As mentioned, the arms 21 and 22 are operatively secured by the hinges or journals 55, or 56 to the carriage 23 which is movable back and forth as indicated by the arrow 57. For this purpose the carriage 23 is supported on rails 58, 59 secured to the factory floor. Rollers 60 support the carriage 23 on the rails 58, 59 for movement in a direction perpendicularly to the rotational axis of the winding arbor 6. Thus, after tilting the arms 21, 22 downwardly away from the winding arbor 6, the carriage 23 may be moved away from the winding apparatus proper. The hinging or tilting movement of the arm 21, 22 may be effected by conventional piston cylinder means not shown, but driven in synchronism with each other.

A traverse rod 24 is movable on the arms 21, 22. For this purpose the arms 21 and 22 are provided with respective guide rails 61 and 62 engaged by slides 63 and 64 for making the traverse rod 24 movable back and forth as indicated by the arrow 65. For this purpose a piston cylinder device 66 is secured to the carriage 23 and its piston rod 67 is pivoted at 68 to the traverse rod 24.

The traverse rod 24 carries, for example, two stop pins 25, 26 operatively arranged for temporarily stopping the rotation of the winding cage 14. Preferably, the stopping pins 25, 26 are slidably mounted in guide bushings 69 and the pins are spring biassed by springs 70 bearing against a shoulder 71 rigidly secured to the respective pin 25, 26 and against the traverse rod 24. In the position shown in FIG. 2 the stop pins 25, 26 engage the outer sleeve 16, for example, in two cut-outs 18, 18'. However, the invention is not limited to this arrangement of the stop pins. These stop pins may engage any portion of the winding cage 14 suitable for temporarily stopping the winding cage 14.

Figure 3:
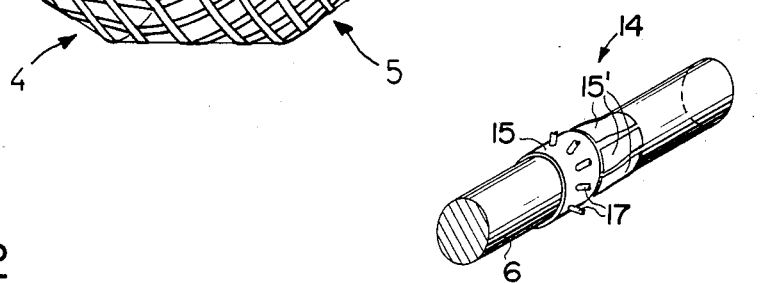
FIG. 3 is a perspective view of the support cage partially broken away to show a friction type clutching device for securing the winding cage to the winding arbor.

In order to enable the stopping of the winding cage 14 relative to the rotation of the winding arbor 6, the winding cage 14 is supported on the winding arbor 6 by friction clutch means 15' shown in FIG. 3. These friction clutch means 15' may comprise a plurality of leaf springs uniformly distributed around the circumference of the winding arbor 6 and engaging the surface of the winding arbor 6 with a predetermined friction grip. When the pins 25, 26 are disengaged from the winding cage 14 by moving the traverse rod 24 downwardly in FIG. 2 by means of the piston cylinder 66, 67, the frictional grip of the leaf springs 15' on the winding arbor 6 is sufficient to rotate the winding cage 14 together with the winding arbor 6. However, when the pins 25, 26 engage the winding cage 14, the friction grip is overcome and the winding cage 14 may be temporarily stopped while the winding arbor 6 keeps rotating.

The winding apparatus according to the invention operates as follows:

Initially, the carriage 23 is moved along rails 58, 59, for example, by an operator, to a location where it may receive a winding arbor 6 provided with a winding cage 14. These winding arbors may be supplied, for example, by an endless conveyor. The winding cage 14 is already in its proper position along the longitudinal axis of the winding arbor 6. Now the operator makes sure that the traverse rod 24 is in a withdrawn or retracted position so that the pins 25, 26 cannot yet engage the winding cage 14 when an arbor 6 with the cage 14 thereon is placed into the carrier members 19, 20 at the free ends of the arms 21, 22. Now the traverse rod 24 is moved with the aid of the piston cylinder 66, 67 in a direction toward the longitudinal axis of the arbor 6 until the pins 25, 26 engage in a pair of cut-outs 18, 18' or the surface of the outer sleeve 16 outside of the cut-outs 18, 18'. Slight rotation of the arbor will then cause the pins 25, 26 to engage the next adjacent cut-outs 18, 18' due to the bias of the springs 70. Thus, the winding cage 14 is fixed in the proper axial position relative to the arbor 6.

Now, the carriage 23 is moved by the operator toward the winding apparatus to such an extent that the mounting spindle 10 and the drive spindle 9 can engage the winding arbor 6 with the aid of the center pin 31 and the clutching mechanism 30. Thus, the state shown in FIG. 2 is accomplished.

Now the drive motor 40 is energized to rotate the winding arbor 6. If at this time the spring biassed pins 25, 26 did not yet engage the respective cut-out 18, 18' the springs will cause such engagement, whereby further rotation of the winding cage 14 is stopped, even though the winding arbor 6 continues to rotate inside the inner sleeve 15 because due to the arresting by the pins 25, 26 the friction force of the clutching leaf springs 15' is overcome.

As the above described drive mechanism including the synchronizing gear device 47 is driven by the motor 40, the fiber strand guiding device 12 will move along the guide rail 11. As soon as the device 12 reaches a predetermined position at the end of the rail 11 which is the starting position for the next following winding operation, the drive of the drive spindle 9 is stopped and the fiber strand is attached to the arbor at a starting point. Thereafter, the traverse rod 24 is withdrawn so that the stop pins 25, 26 are disengaged from the respective cut-outs 18, 18'. Thereafter, the arms 21, 22 are tilted downwardly, for example, by piston cylinder means not shown, whereupon the arms 21, 22 can be removed from the winding machine by moving the carriage 23 away from the winding machine.

In this manner the cut-outs 18, 18' are located in a precisely defined angular position relative to the starting position of the device 12 at the beginning of a winding operation. The winding position of the cut-outs 18, 18' relative to the starting position of the fiber strand guiding device 12 is so adjusted that during the following performance of the winding operation the fiber strands 3 are always exactly deposited in a cut-out 18, 18', whereby always that cut-out or pair of cut-outs is selected which assures or corresponds to the desired winding pattern.

Although the invention has been described with reference to specific example embodiments, it will be appreciated, that it is intended, to cover all modifications and equivalents within the scope of the appended claims.

What is claimed is:

1. An apparatus for producing tubular structural components by winding fiber strands onto a winding support member, comprising machine frame means, winding arbor means forming said winding support member, arbor mounting means for removably and rotatably supporting said winding arbor means in said machine frame means, first drive means connected to said mounting means for rotating said winding arbor means, strand guide means for guiding said fiber strands during a winding operation, support means for movably supporting said strand guide means for cooperation with said winding arbor means, second drive means connected to said strand guide means and cooperating with said first drive means for driving said strand guide means in synchronism with the rotating of said winding arbor means, a winding cage (16), friction clutch means operatively securing said winding cage on said winding arbor means for rotating said winding cage together with the winding arbor means, stop means operatively arranged for temporarily stopping rotation of said winding cage, said winding cage (16) having at least one circumferential end edge and cut-outs in said circumferential end edge for receiving wound fiber strands in said cut-outs, said cut-outs (18, 18') having such angular spacings from each other in the circumferential direction of said winding cage (16) so that a back-and-forth movement of said strand guide means and the angular position of said winding cage are coordinated to each other for laying fiber strands into said cut-outs when the winding cage is released by said stop means for rotation with said winding arbor means, whereby said fiber strands are laid along a non-geodesic line on an axial section of said winding arbor means determined by said winding cage.

2. The apparatus of claim 1, wherein said stop means (25, 26) are arranged for temporarily engaging at least one of said cut-outs.

3. The apparatus of claim 1, wherein said stop means comprise arresting pin means, spring bias means arranged for biassing said arresting pin means into a winding cage arresting position whereby said arresting pin means stop rotation of said winding cage as long as said arresting pin means engage said winding cage.

4. The apparatus of claim 1, wherein said arbor mounting means comprise an arbor positioning carriage (23) for moving said winding arbor means into a mounting position, and wherein said stop means comprise means for movably supporting said stop means on said arbor positioning carriage.

5. The apparatus of claim 4, wherein said arbor positioning carriage (23) comprises two holding elements (19, 20) for rotatably holding a winding arbor means at two locations axially spaced from each other.

6. The apparatus of claim 5, wherein said arbor positioning carriage comprises two arms providing one of said holding elements at each free arm end, and journal means operatively securing said arms to said arbor positioning carriage for tilting said arms.

7. The apparatus of claim 6, wherein said means for movably supporting said stop means comprise a traverse rod (24), means movably supporting said traverse rod on said two arms, and operating means on said arbor positioning carriage connected to said traverse rod for moving said stop means.

8. The apparatus of claim 7, wherein said winding cage has two end edges, said cut-outs being located in both end edges, and wherein said stop means comprise two arresting pins mounted on said traverse rod (24), and spring means for biassing said arresting pins into a respective cut-out.

* * * * *